June 5, 1928.
A. E. JOHNSON
TIRE SPREADER AND TIRE IRON
Filed Oct. 20, 1927
1,672,066
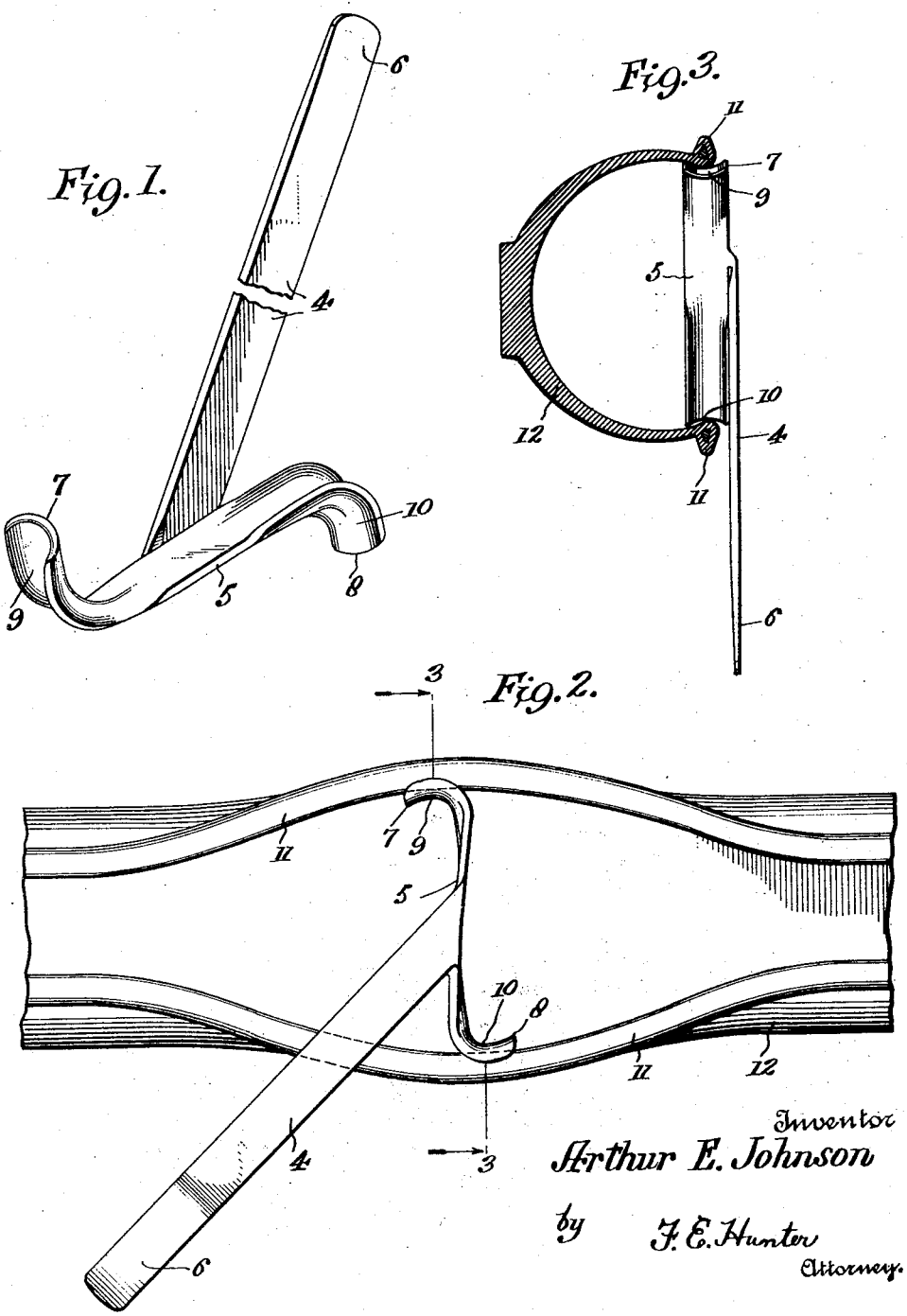
Inventor
Arthur E. Johnson
by J. E. Hunter
Attorney.

Patented June 5, 1928.

1,672,066

UNITED STATES PATENT OFFICE.

ARTHUR E. JOHNSON, OF EL PASO, TEXAS, ASSIGNOR TO JOHN S. CURTISS, OF EL PASO, TEXAS.

TIRE SPREADER AND TIRE IRON.

Application filed October 20, 1927. Serial No. 227,554.

The present invention relates to improvements in a tire spreader and tire iron, and has for an object to provide an improved implement useful in spreading apart the beads of automobile tire casings for the purpose of giving access to the interior portions of the tread in the search for tacks, nails, thorns, and other sharp foreign bodies which cause puncture of inner tubes.

Another object of the invention is to provide a comparatively small, portable, implement capable of being carried in the vehicle, and acting not only to spread the tires as previously stated, but also useful as a tire iron for removing the tires from the rims.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a perspective view of an improved implement constructed according to the present invention.

Figure 2 is a plan view of the improved implement and of a portion of a tire casing spread by the implement, and Figure 3 is a cross section taken on the line 3—3 in Figure 2.

Referring more particularly to the drawings, the improved implement consists generally of a handle 4 and a head piece 5. The handle 4 is tapered at its free end 6 to conform to the shape of a tire iron.

The head 5 extends generally cross-wise with respect to the handle 4, or in other words, the handle is arranged diagonally of the head for the purpose of projecting without the perimeter of the tire casing, as shown in Figure 2. As a consequence, the handle 4 may be more readily grasped, and worked with better facility. Both the handle 4 and head 5 may be constructed of any appropriate material, either in one or more pieces; but I find that the tool may be made inexpensively by stamping the same flat-wise out of a sheet of wrought iron, and bending the head 5 at right angles to the plane of the handle 4. As a result, the head piece 5 from an edge-wise aspect is at substantially 90° from the flat-wise plane of the handle; while viewed from a length-wise aspect of the head piece 5, the same occupies a diagonal position with respect to the handle, or the handle and head piece are at substantially 45° to one another.

The opposite ends 7 and 8 of the head piece 5 are turned or curved in opposite directions, and are bent or shaped transversely into troughs 9 and 10. These troughs are convex as to their longitudinal surfaces extending length-wise of the head piece 5, and are concave transversely. This construction reinforces and strengthens the head piece at the terminals thereof, where the same engages the beads 11 of the tire casing or shoe shown at 12.

In the use of the device, the head piece 5 is inserted within the circle of the tire casing 12 and lengthwise in line with the opening between the beads 11. The end portions of the head piece are inserted between the beads 11, and the devices turned clock-wise, by manipulation of the handle 4, to the position shown in Figure 2. The opposite beads of the tire are received in the opposite troughs 9 and 10 of the head piece 5, which now extends transversely of the casing or shoe, and has pushed the beads apart, so that access may be readily had to the inner portion of the tread of the tire for probing for nails and the like, the points of which are apt to puncture or injure the inner tube. The handle 4, on account of its relative position with the head piece 5 is not substantially in the way but leaves the spaces at opposite sides of the head piece open to the hand and implement of the explorer.

The implement is made to " walk about " within the tire by shifting the handle 4 back and forth and pushing or pulling the tool about in the tire. This operation may be conducted with one hand while the other hand is used to explore the inner surface of the tire tread. The implement will remain in the position shown in Figure 2 without aid of the operator due to the inherent resiliency of the rubber tire pressing upon the transversely positioned head piece.

Prior to the exploration just referred to, it is essential that the tire casing be removed from the rim, and the handle 4 will be found useful for this purpose, the sharpened or beveled end 6 being inserted between the tire beads and rim after a manner well-known in this art.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A tire implement comprising a head having reversely curved and troughed opposite ends adapted to receive and spread the beads of a tire casing, and a handle attached to said head.

2. An improved tire implement comprising a head piece having reversely curved and troughed opposite end portions adapted to engage and spread the beads of a tire casing, and a handle for the head extending diagonally from said head.

ARTHUR E. JOHNSON.